United States Patent [19]

Onoue

[11] 4,204,263
[45] May 20, 1980

[54] FLYBACK TRANSFORMER
[75] Inventor: Shoji Onoue, Tokyo, Japan
[73] Assignee: Denki Onkyo Co., Ltd., Tokyo, Japan
[21] Appl. No.: 898,284
[22] Filed: Apr. 20, 1978
[30] Foreign Application Priority Data Apr. 20, 1977 [JP]  Japan .................................. 52-45578
Apr. 22, 1977 [JP]  Japan .............................. 52-51025[U]

[51] Int. Cl.² ....................... H02M 7/06; H01F 27/30
[52] U.S. Cl. ........................................ 363/68; 363/59;
                                                     336/185; 363/126
[58] Field of Search ................. 363/61, 67, 68, 59-60,
                363/126; 336/180, 185, 207, 208; 315/411

[56] References Cited
U.S. PATENT DOCUMENTS

| | | | |
|---|---|---|---|
| 3,264,590 | 8/1966 | Trench | 336/147 X |
| 3,381,204 | 4/1968 | Cox | 363/61 |
| 3,652,968 | 3/1972 | Johnston et al. | 336/185 X |
| 3,745,438 | 7/1973 | Saeki | 363/145 |
| 3,813,574 | 5/1974 | Sato | 336/185 X |
| 3,886,434 | 5/1975 | Schreiner | 363/68 |
| 3,904,928 | 9/1975 | Sawada et al. | 315/410 |
| 4,016,478 | 4/1977 | Anders et al. | 363/67 |

Primary Examiner—J. D. Miller
Assistant Examiner—Peter S. Wong
Attorney, Agent, or Firm—Armstrong, Nikaido, Marmelstein & Kubovcik

[57] ABSTRACT

A flyback transformer comprising a magnetic core and primary and secondary windings wound around the magnetic core, the secondary winding being divided into a plurality of coil units and alternately connected in series with the same plurality of rectifying diodes, the coil units being wound around individual layer bobbins, the bobbins being assembled in layers and fitted alternately and the outermost layer bobbin being mounted with a support on which a plurality of diodes are fixed, whereby the whole flyback transformer obtains a compact structure.

7 Claims, 8 Drawing Figures

FLYBACK TRANSFORMER

BACKGROUND OF THE INVENTION

The present invention relates to a flyback transformer which supplies a high voltage to a cathode ray tube of a television receiver, specifically a flyback transformer having the secondary winding formed by winding a plurality of coil units into which the secondary winding is divided, around individual layer bobbins and assembling the layer bobbins in a plurality of layers.

The cathode ray tubes of television receivers require in general high DC voltages of 10 to 30 kV. This output voltage from the flyback transformer is rectified through rectifying diodes with high breakdown voltage strength.

In general, the flyback transformers are designed to generate high voltages by a higher harmonic tuning system, thus improving the regulation. Recently, for tuning at a higher frequency than the fifth harmonic, the secondary winding is divided into a plurality of coil units by a plurality of diodes to reduce a distributed capacitance of the secondary winding. In case of such secondary winding, each coil unit is separated to be alternatingly independent and therefore a pulse voltage generated by each coil unit is low and favorable for electrical insulation and a low breakdown voltage strength diode can be employed.

However, if the coil units are wound in layers with layer insulation paper or polyester film as conventional, the secondary winding increases in diameter and a leakage inductance necessarily increases and it is thus difficult to obtain higher harmonic tuning.

On the other hand, if the number of turns per layer of the coil unit is increased using the layer insulation paper or polyester film, a magnetic coupling to the primary winding increases and the leakage inductance becomes small but an insulation resin for insulation between layers is difficult to be impregnated into the layers and the insulation effect deteriorates accordingly from the point of view of dielectric strength.

SUMMARY OF THE INVENTION

An object of the present invention is to provide a new flyback transformer in which the leakage inductance of the secondary winding is reduced and the output voltage regulation of the secondary winding is improved.

Another object of the present invention is to provide an improved flyback transformer in which an insulation material is fully impregnated by winding and assembling in layers the coil units of the secondary winding and the dielectric strength between coil units is improved.

In a flyback transformer according to the present invention, a pair of magnetic cores are combined and the primary winding wound around the coil bobbin is mounted on its legs. A plurality of terminals which are extended in the radial directions are provided in the circumferential direction on the ends of coil bobbins and have the terminal pins for connecting the lead wires of the primary winding at their extreme ends. The secondary winding to be mounted on the primary winding is comprised of a plurality of coil units and a plurality of rectifying diodes which are alternately connected in series. Each coil unit is wound in a single layer around each of a plurality of layer bobbins which have different diameters, the layer bobbins are alternately fitted and assembled in layers to ensure the magnetic coupling to the primary winding and reduce the leakage inductance of the secondary winding, thus improving the regulation of output voltage of the secondary winding. A plurality of projections with the height larger than the diameter of conductor to be wound around the layer bobbin are provided in the circumferential direction at least at both ends of the layer bobbins. When the layer bobbins are assembled in layers, the extreme ends of the projections engage with the peripheral surfaces of adjacent layer bobbins whereby a space is formed between the coil unit and an adjacent layer bobbin and filled with a sufficient amount of insulation material to increase the dielectric strength between coil units. A support to which a plurality of rectifying diodes are to be attached is mounted on the outermost layer bobbin and the lead wires from the coil units wound around the layer bobbins are connected in sequence and the final stage diodes are connected to the high voltage lead wires.

DETAILED DESCRIPTION OF THE PREFERRED EMBODIMENTS

Figure 1:
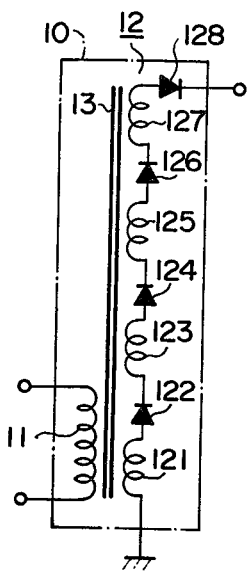
FIG. 1 shows the connection of the flyback transformer according to the present invention.

Referring to FIG. 1, the primary winding 11 of the flyback transformer 10 is mounted on the magnetic core 13 made of ferrite together with the secondary winding 12. The secondary winding is divided into a plurality of coil units 121, 123, 125 and 127 which are alternately connected in series to the rectifying diodes 122, 124 and 126. One end of the innermost coil unit 121 is grounded alternatingly and one end of the coil unit 127 is connected to the anode of the cathode ray tube through the rectifying diode 128 of the final stage, thereby the total voltage rectified by the rectifying diodes 122, 124, 126 and 128 is supplied to the anode of the cathode ray tube.

Figure 2:
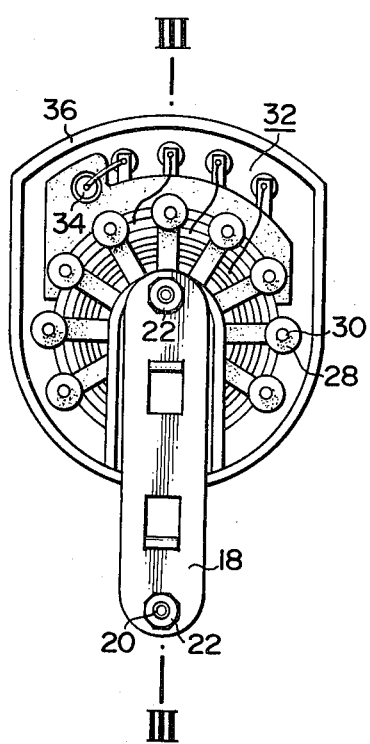
FIG. 2 is a plan view of the flyback transformer related to the present invention.
Figure 3:
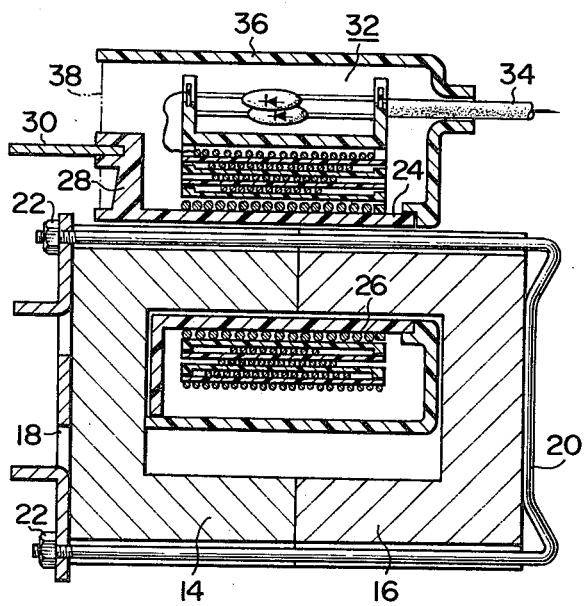
FIG. 3 shows the cross section along the III—III line of the flyback transformer shown in FIG. 2.

FIGS. 2 and 3 show a practical construction of the flyback transformer which is connected as shown in FIG. 1. A pair of U-shaped magnetic cores 14 and 16 are firmly clamped with the metal plate 18, clamp bolt 20 and nut 22. The cylindrical coil bobbin 24 made of plastic is mounted on the legs of magnetic cores 14 and 16 and the primary winding 26 is wound around the coil bobbin. A plurality of terminal parts 28 extended in the radial direction are disposed with predetermined intervals in the circumferential direction on one end of the coil bobbin 24, and an end of single terminal pin 30 is set in the extreme end of each terminal part 28, and the other end of the terminal pin 30 is projected in the axial direction of the coil bobbin 24.

The secondary winding 32 is mounted on the primary winding 26. The lead wire from the grounding side of the secondary winding 32 is connected one of the terminal pins 30. The output from the high voltage side of the secondary winding, that is, the high output rectified into a DC voltage is drawn out by the anode lead wire 34 and supplied to the anode of the cathode ray tube not shown.

The primary winding 26 and the secondary winding 32 are housed in the insulation case 36 made of a kind of plastic such as polybutyleneterephthalete reinforced with glass fiber, likewise the coil bobbin 24 and the insulation case 36 is filled up to the position shown by the broken line 38 with an insulation material such as epoxy resin or 1, 2-polybutadiene resin compound. The insulation material is omitted from the drawings for simplification of the description.

Figure 4:
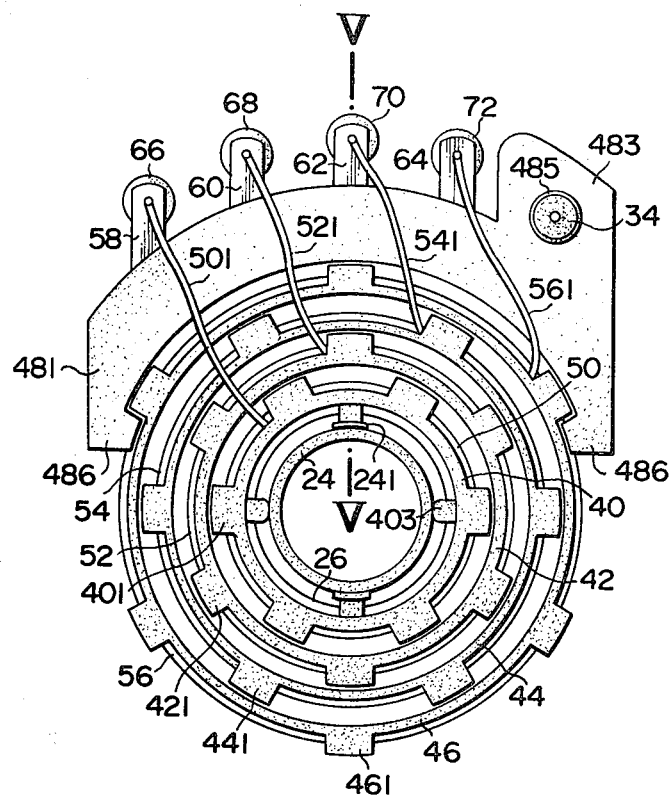
FIG. 4 is a plan view of only the primary and secondary windings of the present invention.
Figure 5:
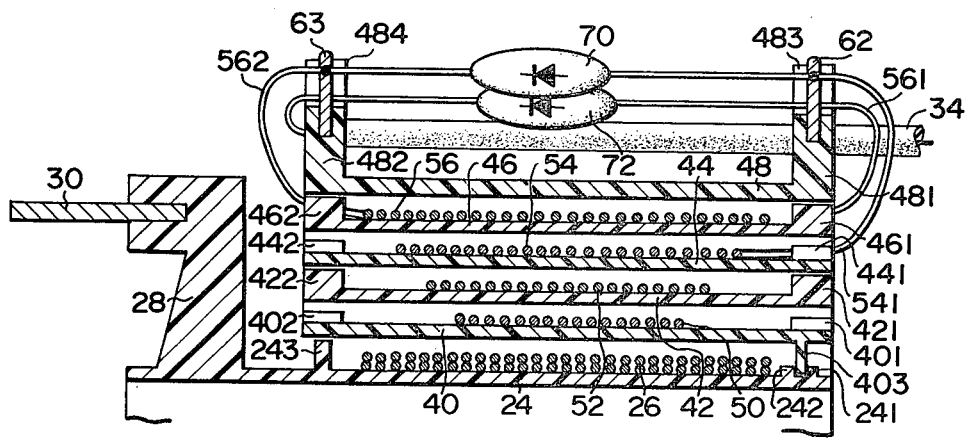
FIG. 5 shows the cross section along the V—V line of the flyback transformer shown in FIG. 4, FIG. 6 and FIG. 7 show another embodiment of the layer bobbin according to the present invention.

The secondary winding 32 is illustrated in detail in FIGS. 4 and 5. A plurality of coil units 50, 52, 54 and 56 of the secondary winding 32 mounted on the primary winding 26 are respectively wound in a single layer on cylindrical layer bobbins 40, 42, 44 and 46 with different diameters. The diameters of conductors of the coil units wound on the layer bobbins is approximately 30 to 50μ and the conductors are wound in the same direction. These layer bobbins are made in a thickness of approximately 1 mm of a kind of plastic such as polycarbonate resin. The layer bobbins can be made of a glass-fiber reinforced resin as the case 36 to minimize thermal deformation of the layer bobbins.

A plurality of projections 401, 402, 421, 422, 441, 442, 461 and 462 are provided at equal intervals in the circumferential direction on both end parts of the peripheries of the layer bobbins. These projections have a little larger height than the diameters of conductors of the coil units wound on the layer bobbins. The tops of these projections contact the internal peripheries of the adjacent layer bobbin. In other words, the projections 401 and 402 of the layer bobbin 40 contact the internal periphery of the bobbin 42, the projections 421 and 422 of the bobbin 42 contact the internal periphery of the bobbin 44 and the projections 441 and 442 of the bobbin 44 contact the internal periphery of the bobbin 46. Thus, small spaces are formed between the coil units 50, 52 and 54 and the internal peripheries of the layer bobbins 42, 44 and 46 and therefore the insulation material can be filled fully and easily.

The semi-cylindrical support 48 made of the same kind of plastic as the layer bobbins is mounted on the outermost layer bobbin 46. A small space is formed between the support 48 and the coil unit 56. The vertical walls 481 and 482 are provided on both ends of the support 48 and the terminals 58, 60, 62, 63 and 64 corresponding to the coil units are provided on the tops of each vertical wall. The lead wires 501, 521, 541 and 561 of the coil units 50, 52, 54 and 56 are connected to the terminals 58, 60, 62 and 64 on the vertical wall 481 and the ends of rectifying diodes 66, 68, 70 and 72 are also connected to the same terminals. The terminals on the vertical wall 482 are not shown in FIG. 4 and the terminal 63 only is shown in FIG. 5. In other words, the other end of rectifying diode 70 is connected to the terminal 63 and the other lead wire 562 of the coil unit 56 is connected to the terminal 63. The connection to other terminals is the same as for terminal 63. The lead wires of the coil units 50, 52, 54 and 56 are led out through the clearances between the projections provided on the layer bobbins 40, 42, 44 and 46. The other lead wires of the coil units 50, 52 and 54 are omitted from the drawings. Parts of the vertical walls 481 and 482 are further extended outside and are used as the lead wire supports 483 and 484, and the through hole 485 into which a thick anode lead wire 34 is inserted is also provided in the lead wire supports. The lead wire 34 is connected to the other end of the final stage rectifying diode 72, that is, the cathode. Accordingly, the coil units 50, 52, 54 and 56 and the rectifying diodes 66, 68, 70 and 72 are connected in series as the secondary winding shown in FIG. 1.

The hooks 486 which face inside are formed on both circumferential edges of the support 48 and engaged with the projections 461 and 462 of the layer bobbin 46 and secured on the layer bobbin 46.

Four projections 403 are formed at 90° intervals in the circumferential direction on an end part of the internal periphery of the innermost layer bobbin 40, while two projections 241 and 242 are formed at 180° intervals in the circumferential direction at a position opposing the above-mentioned projection 403 on the external periphery of the coil bobbin 24 on which the primary winding 26 is wound. The extreme end of the projection 403 is interpositioned between these two projections 241 and 242. Four projections 243 at the side of terminal part 28 are formed at 90° intervals in the circumferential direction on the external periphery of the coil bobbin 24 and the extreme end of the projection 243 contacts the internal periphery of the layer bobbin and supports the layer bobbin 40 in cooperation with the projection 403 so that the layer bobbin 40 is coaxial with the coil bobbin 24.

The coil units 50, 52, 54 and 56 wound around the layer bobbins 40, 42, 44 and 46 are divided by the rectifying diodes 66, 68 and 70 and can therefore be regarded as the independent coils alternatingly. Accordingly, it is preferable for the coil units to provide the higher harmonic tuning of the same frequency, for example, the fifth harmonic tuning in conjunction with the primary winding 26 in order to supply a high DC voltage with less regulation to the anode of the cathode ray tube.

For this purpose, in FIG. 5, the number of turns of coil of the coil units is relatively reduced in the order from the outermost layer bobbin toward the coil unit 50 wound around the layer bobbin 40 nearest the primary winding 26, and the width of turns of the coil units 40, 42, 44 and 46 in the same winding pitch and direction is increased gradually so that it is the largest on the outermost coil unit 56. By this arrangement, the flyback transformer can be designed so that the coupling factors between the primary winding 26 and the coil units 50, 52, 54 and 56 tend to be equal. Accordingly, an advantage is found to make it easy to resonate at the same frequency respective higher harmonic resonance circuits which are made with the distributed capacities including the earth capacitance of the coil units 50, 52, 54 and 56 and leakage inductances of respective coil units.

Figure 6:
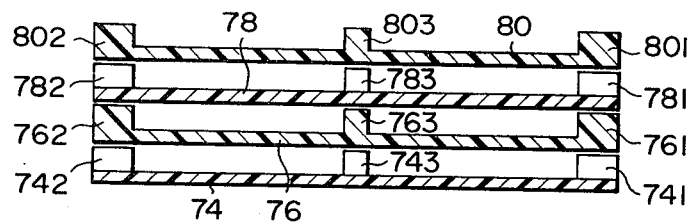

FIG. 6 shows another embodiment of the layer bobbin according to the present invention. The projections 741, 742, 761, 762, 781, 782, 801 and 802 are provided on both ends of the layer bobbins 74, 76, 78 and 80 and the projections 743, 763, 783 and 803 are formed on the central parts. The layer bobbins can be supported to be free from deformation even though the thickness of the layer bobbins 74, 76, 78 and 80 is small since the projections are provided at the central parts as described above.

Figure 7:
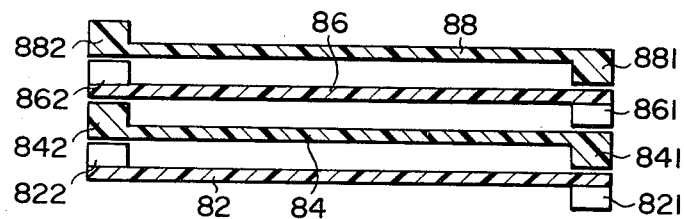

FIG. 7 shows another embodiment of the layer bobbin according to the present invention. The projections formed at both ends of the layer bobbins 82, 84, 86 and 88 are such that they are provided on the external periphery of one ends and on the internal periphery of the other ends. When using the layer bobbins and mounting the support 48 as shown in FIG. 5 on the outermost layer bobbin 82, the hooks 486 of the support 48 should be modified in shape and the projection 401 provided on the external periphery of the innermost layer bobbin 40 shown in FIG. 5 will be unnecessary.

Figure 8:
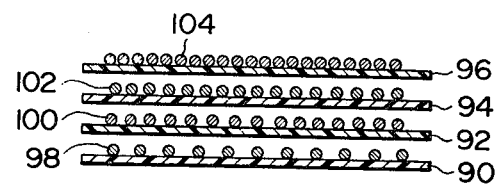
FIG. 8 shows another embodiment of the winding pitch of the coil unit according to the present invention.

FIG. 8 shows another embodiment of the coil unit. The widths of turns of the coil units 98, 100, 102 and 104 wound around the layer bobbins 90, 92, 94 and 96 are equal but the winding pitch becomes larger and the number of turns becomes smaller towards the lower layers. In this case, the flyback transformer can be designed so that the coupling factor of the primary winding and the coil units does not largely changed.

In the above-mentioned embodiments, there is shown an example that the number of turns of the coil units wound on the stacked layer bobbins vary with respective layer bobbins. The numbers of turns of the coil units wound on the layer bobbins may be equal. In this case, the farther the coil units are positioned from the primary winding, the larger the leakage inductance is. However, such leakage inductance is acceptable for actual television receivers.

The above describes the flyback transformer provided with four coil units but the number of coil units is not limited to four for the flyback transformers according to other embodiments. In this case, the numbers of the layer bobbins and rectifying diodes are determined in accordance with the number of the coil units.

It is evident that the layered arrangement of the layer bobbins can be ensured by providing an engaging means such as the projections 241 and 242 of the above-mentioned coil bobbin 24 and the projection 403 of the layer bobbin 40 between the projection of each layer bobbin and the next layer bobbin.

Moreover, though the support 48 which supports the diodes is made in a semi-circular form, the hook 486 may be modified into an annular form by extending it in the circumferential direction of the layer bobbin 46.

What is claimed is:

1. A flyback transformer comprising a magnetic core, primary and secondary windings wound around said magnetic core, said secondary winding including a plurality of coil units and a plurality of rectifying diodes, said coil units and said rectifying diodes being alternately connected in series, a coil bobbin on which said primary winding is wound, a plurality of concentric layer bobbins with different diameters on which said secondary winding is wound, each of said coil units being wound in a single layer around each of said layer bobbins, means for forming a predetermined space between said layer bobbins when the layer bobbins are assembled in layers and means mounted on an outermost layer bobbin of said layer bobbins for supporting said rectifying diodes.

2. A flyback transformer comprising:
  (a) a magnetic core;
  (b) primary and secondary windings being mounted about said magnetic core, said secondary winding including a plurality of coil units and a plurality of rectifying diodes, said coil units and said rectifying diodes being alternately connected in series;
  (c) a coil bobbin on which said primary winding is wound;
  (d) a plurality of layer bobbins with different diameters on which said secondary winding is wound, each of said layer bobbins being concentrically mounted in layers about said magnetic core, each of said coil units being wound in a single layer and in the same direction about each of said layer bobbins;
  (e) means for forming a predetermined space between said layer bobbins when the layer bobbins are assembled in layers; and
  (f) means for supporting said rectifying diodes mounted on the outermost layer bobbin of said layer bobbins assembled in layers.

3. A flyback transformer according to claim 2 wherein each of said layer bobbins has a plurality of projections in the circumferential direction at least on both parts of the layer bobbins, thereby forming the space between said layer bobbins assembled in layers.

4. A flyback transformer according to claim 2 wherein each of said coil units has substantially the same number of turns.

5. A flyback transformer according to claim 2 wherein the number of turns of the coil unit wound on said outermost layer bobbin is greater than the number of turns of the coil unit wound on the innermost layer bobbin.

6. A flyback transformer according to claim 5 wherein the width of the turns of the coil unit of said outermost layer bobbin is substantially equal to the width of the turns of the coil unit of said innermost layer bobbin with the winding pitch of the innermost coil unit being larger than the winding pitch of the outermost coil unit.

7. A flyback transformer according to claim 2 wherein said support means for said rectifying diodes comprises a semi-cylindrical support and couplers engaged with said outermost layer bobbin.

* * * * *